United States Patent
Khachatryan

(10) Patent No.: US 9,352,541 B2
(45) Date of Patent: May 31, 2016

(54) APPARATUS FOR TEMPORARY BONDING OF SUBSTRATE ON A CARRIER AND METHOD THEREOF

(71) Applicant: SAMSUNG DISPLAY CO., LTD., Yongin, Gyeonggi-Do (KR)

(72) Inventor: Hayk Khachatryan, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 240 days.

(21) Appl. No.: 14/090,015

(22) Filed: Nov. 26, 2013

(65) Prior Publication Data

US 2015/0000838 A1 Jan. 1, 2015

(30) Foreign Application Priority Data

Jun. 28, 2013 (KR) ........................ 10-2013-0075576

(51) Int. Cl.
| | |
|---|---|
| *B29C 65/52* | (2006.01) |
| *B32B 37/12* | (2006.01) |
| *B32B 38/10* | (2006.01) |
| *B32B 43/00* | (2006.01) |
| *C09J 9/02* | (2006.01) |
| *B29L 31/34* | (2006.01) |

(52) U.S. Cl.
CPC .............. *B32B 43/006* (2013.01); *B32B 37/12* (2013.01); *C09J 9/02* (2013.01); *B29L 2031/3475* (2013.01); *B32B 2457/20* (2013.01)

(58) Field of Classification Search
USPC ........................... 156/247, 701, 711, 750, 752
See application file for complete search history.

(56) References Cited

U.S. PATENT DOCUMENTS

| | | | | |
|---|---|---|---|---|
| 5,100,494 | A | * | 3/1992 | Schmidt ................ B29C 65/342 156/273.9 |
| 5,232,860 | A | | 8/1993 | Kawanishi et al. |
| 5,258,236 | A | | 11/1993 | Arjavalingam et al. |
| 5,637,176 | A | * | 6/1997 | Gilleo ..................... B29C 41/12 156/277 |
| 7,029,960 | B2 | | 4/2006 | Hashimoto et al. |
| 8,431,866 | B2 | * | 4/2013 | Wilson ..................... H05B 3/34 156/71 |
| 2011/0311789 | A1 | | 12/2011 | Loy et al. |
| 2013/0255873 | A1 | * | 10/2013 | Watts .................. H01L 21/6835 156/247 |

FOREIGN PATENT DOCUMENTS

| | | |
|---|---|---|
| JP | 06-100067 | 4/1994 |
| JP | 06-290870 | 10/1994 |
| WO | 2005048669 | 5/2005 |
| WO | 2005050754 | 6/2005 |

OTHER PUBLICATIONS

Gregory P. Grawford (Editor), "Flexible Flat Panel Displays", John Wiley & Sons, Ltd. 2005 (relevant chapters).

H. Gleskova, et al., "a-Si:H TFTs made on polyimide foil by PECVD at 150oC," Proceedings of the Materials Research Society, vol. 508, pp. 73-78, 1998.

(Continued)

*Primary Examiner* — Sing P Chan
(74) *Attorney, Agent, or Firm* — F. Chau & Associates, LLC

(57) ABSTRACT

An apparatus for temporarily bonding a substrate on a carrier includes an electrically conductive adhesion layer disposed between the carrier and the substrate, and a current supply source configured to apply a current to the electrically conductive adhesion layer.

13 Claims, 5 Drawing Sheets

(56) References Cited

OTHER PUBLICATIONS

F. E. Doany, et al., "Laser release process to obtain freestanding multilayer metal polyimide circuits," IBM Journal of Research and Development vol. 41, pp. 151-155, 1997.

F. Lemmi et al., "High-performance TFTs fabricated on plastic substrates," IEEE Electron Device Letters, vol. 25, pp. 486-488, 2004.

R. Puligadda, et al., "High performance temporary adhesives for wafer bonding applications," Matererials Research Society Symposium Proceedings., vol. 970, pp. 239-249, 2007.

Jesmin Haq, et al., "Temporary bond-debond technology for high-performance transistors on flexible substrates", Journal of the SID 18/11, 2010, pp. 884-891.

* cited by examiner

APPARATUS FOR TEMPORARY BONDING OF SUBSTRATE ON A CARRIER AND METHOD THEREOF

CROSS-REFERENCE TO RELATED APPLICATIONS

This application claims priority under 35 U.S.C. §119 to Korean Patent Application No. 10-2013-0075576 filed on Jun. 28, 2013, the disclosure of which is incorporated by reference herein in its entirety.

TECHNICAL FIELD

Exemplary embodiments of the present invention relate to temporarily bonding a substrate on a carrier, and more particularly, to an apparatus for temporarily bonding a substrate on a carrier, and a method therefor.

DISCUSSION OF THE RELATED ART

Plastic and thin glass materials are being more commonly used for flexible displays due to their low thermal resistance. Additional steps performed during a low temperature polysilicon (LTPS) process such as, for example, transferring a thin film transistor (TFT), may be performed during fabrication.

SUMMARY

Exemplary embodiments of the present invention provide an apparatus and a method for temporarily bonding and delaminating a substrate on a carrier.

Moreover, exemplary embodiments of the present invention provide an apparatus and a method for temporarily bonding and delaminating a substrate on a carrier in a case in which a flexible material and a rigid carrier are heated to a temperature of about 300° C. or higher.

According to an exemplary embodiment of the present invention, an apparatus for temporarily bonding a substrate on a carrier includes an electrically conductive adhesion layer disposed between the carrier and the substrate, and a current supply source configured to apply a current to the electrically conductive adhesion layer.

According to an exemplary embodiment of the present invention, a method for temporarily bonding a substrate on a carrier includes forming an electrically conductive adhesion layer on a surface of the carrier, laminating the substrate on the electrically conductive adhesion layer, applying a current to the electrically conductive adhesion layer to heat the electrically conductive adhesion layer, and delaminating the substrate from the surface of the carrier by breaking a bond formed by the adhesive of the electrically conductive adhesion layer.

According to an exemplary embodiment of the present invention, a semiconductor device includes a substrate and a carrier. The carrier is configured to be coupled to the substrate via an electrically conductive adhesion layer disposed between the substrate and the carrier. The electrically conductive adhesion layer is configured to receive a current supplied by a current supply source.

According to exemplary embodiments of the present invention, a flexible substrate may be bonded to a carrier in a sufficiently strong manner using an electrically conductive adhesive that permits the two layers to be separated from each other by applying a high voltage for a short period of time after a heat treatment.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
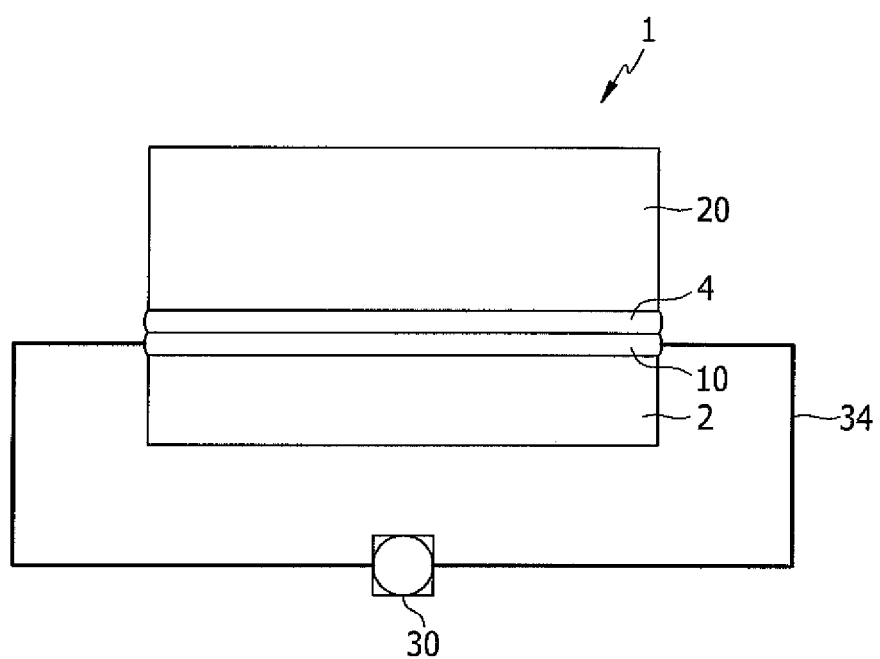
FIG. 1 is a schematic diagram showing an apparatus for temporarily bonding and delaminating a substrate on a carrier, according to an exemplary embodiment of the present invention.

Exemplary embodiments of the present invention will be described more fully hereinafter with reference to the accompanying drawings. Like reference numerals may refer to like elements throughout the accompanying drawings.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. In addition, it will also be understood that when a layer is referred to as being "between" two layers, it can be the only layer between the two layers, or one or more intervening layers may also be present.

It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a schematic diagram showing an apparatus for temporarily bonding and delaminating a substrate on a carrier, according to an exemplary embodiment of the present invention.

Referring to FIG. 1, the apparatus 1 for temporarily bonding and delaminating the substrate 4 on the carrier 2 in accordance with an exemplary embodiment may include an adhesion layer 10 disposed between the carrier 2 and the substrate 4, and a current supply source 30 configured to apply a current to the adhesion layer 10. Herein, the substrate 4 may be referred to as a flexible substrate 4. Further, reference to temporarily bonding the substrate 4 on the carrier 2 is made with regards to bonding the substrate 4 on the carrier 2 in a non-permanent manner in which the substrate 4 may be delaminated from the carrier 2 without damaging the substrate 4. The apparatus 1 may be used to fabricate a semiconductor device including, for a example, a display device including the substrate 4.

The carrier 2 may be, for example, a rigid carrier. According to an exemplary embodiment, the carrier 2 may be formed to have a panel shape such that the substrate 4 can be delaminated from the carrier 2 after being attached thereto in a state in which the adhesion layer 10 is applied to a top surface of the carrier 2.

Although the carrier 2 may be a rigid carrier, the carrier is not limited thereto. For example, the carrier may be any material and may have any configuration and shape that is capable of providing a holding means permitting a flexible substrate to be delaminated from the holding means to be subjected to a following process subsequent to being subjected to a previous process (e.g., a low temperature polysilicon (LTPS) process), in a state in which the flexible substrate is laminated on a top surface of the holding means.

The adhesion layer 10 is formed on the carrier 2. In an exemplary embodiment, the adhesion layer 10 may be formed as an electrically conductive adhesion layer using an electrically conductive adhesive having temperature resistance. Herein, the adhesion layer 10 may be referred to as an electrically conductive adhesion layer 10.

The adhesion layer 10 may include an adhesive such as, for example, an epoxy or a polyimide-based resin, however the material of the adhesion layer 10 is not limited thereto.

The adhesion layer 10 has a temperature resistance such that the adhesion layer 10 may be used for temporal bonding/delamination of a flexible substrate. For example, the adhesion layer 10 may have a temperature resistance of about 450° C. or higher.

The adhesive of the adhesion layer 10 may be uniformly, or substantially uniformly applied onto the carrier in an initial step. After the application of the adhesive, a pre-treatment process may be performed, or a flexible substrate may be directly laminated without performing a pre-treatment process, according to exemplary embodiments.

The flexible substrate 4 is laminated on the electrically conductive adhesion layer 10. The flexible substrate 4 may be formed of, for example, plastic, glass (e.g., thin glass), a metal foil, etc., however the flexible substrate 4 is not limited thereto.

Referring to FIG. 1, the current supply source 30, which supplies a current to the electrically conductive adhesion layer 10, and a conducting wire 34, which transmits the current supplied from the current supply source 30 to the electrically conductive adhesion layer 10, are connected to the electrically conductive adhesion layer 10.

In an exemplary embodiment, the current supply source 30 may supply a high voltage current (e.g., a current capable of providing a relatively high voltage) to the electrically conductive adhesion layer 10 for a short time. As a result, the bond created by the electrically conductive adhesion layer 10 may be broken, allowing for the carrier 2 and the flexible substrate 4 to be disconnected/detached from each other. The value of the applied current and/or voltage, and/or the application time of the applied current and/or voltage may be controlled to break the bond formed by the adhesion layer 10 without causing damage to the flexible substrate 4.

In an exemplary embodiment, a bulk metal 20 may be brought into contact with the flexible substrate 4 or the carrier 2. Although the configuration shown in FIG. 1 illustrates the bulk metal 20 being located on the flexible substrate 4, the location of the bulk metal 20 is not limited thereto. The bulk metal 20 may be formed of, for example, copper, aluminum, nickel, titanium, or any combination thereof, however the bulk metal 20 is not limited thereto. The bulk metal 20 may protect the flexible substrate 4, as described in further detail below.

According to an exemplary embodiment, when a high voltage current is applied to the electrically conductive adhesion layer 10, the temperature of the adhesion layer 10 may be rapidly increased to a temperature level that is higher than a breaking point of the adhesive of the adhesion layer 10. Once the temperature level increases beyond the breaking point, the bond created by the adhesion layer 10 is broken, permitting the flexible substrate 4 to be separated from the carrier 2.

As described above, the bulk metal 20 may be included in the apparatus 1 to protect the flexible substrate 4. For example, the bulk metal 20 may protect the flexible substrate 4 from damage that may potentially be caused by the high temperature that results from applying a high voltage current to the electrically conductive adhesion layer 10. The bulk metal 20 may have a wide contact surface so as to be attached over an entire area, or over a substantially entire area, of the flexible substrate 4 or the carrier 2.

When the bulk metal 20 is disposed on the flexible substrate 4 (or the carrier 2), the flexible substrate 4 disposed beneath the bulk metal 20, which as described above, may have high thermal conductivity, may be rapidly cooled by the bulk metal 20. For example, the flexible substrate 4 may be cooled when the temperature is increased via an electric current provided to the adhesion layer 10, or when the flexible substrate 4 is heated.

Thus, according to exemplary embodiments of the present invention, undesired influences on the flexible substrate 4, which may vary in accordance with different temperature changes during a delamination process, may be reduced.

Figure 2:
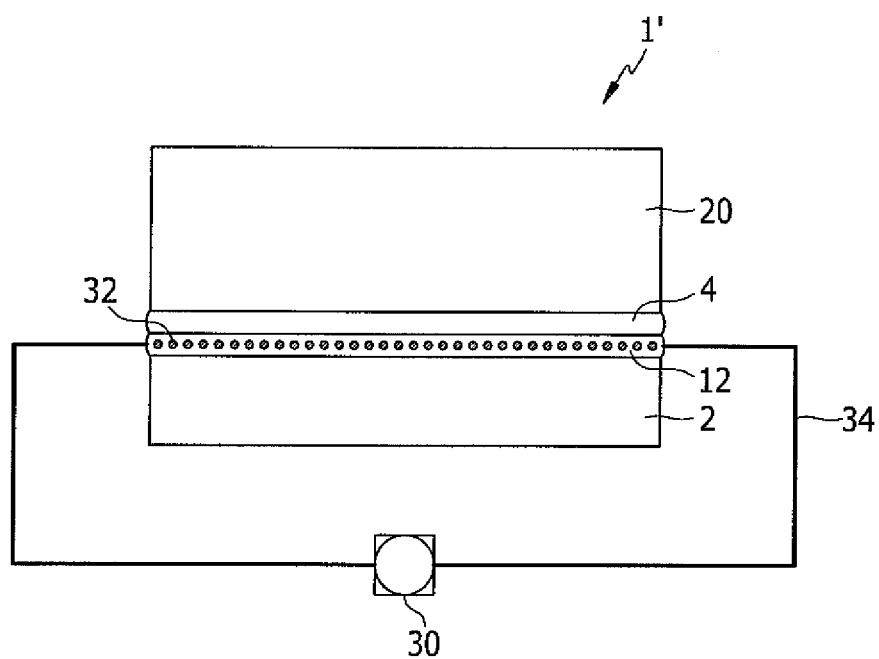
FIG. 2 is a schematic diagram showing an apparatus for temporarily bonding and delaminating a substrate on a carrier, according to an exemplary embodiment of the present invention.
Figure 3:
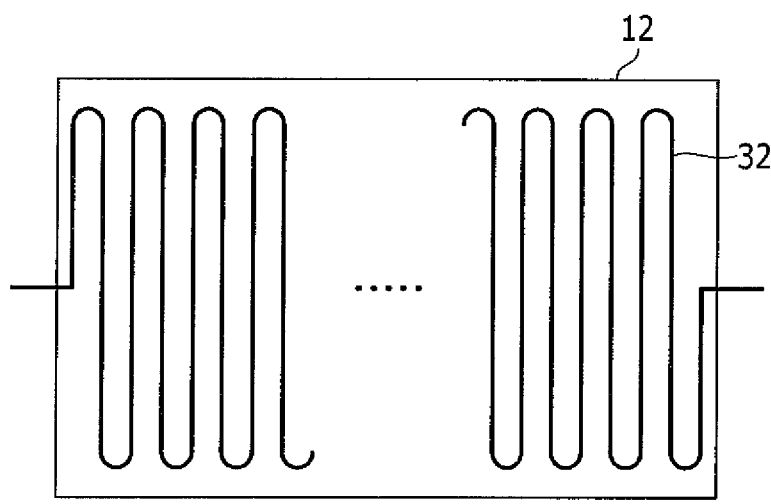
FIGS. 3 and 4 are plan views showing examples of the arrangement of a wire within an adhesion layer of the apparatus of FIG. 2, according to exemplary embodiments of the present invention.
Figure 4:
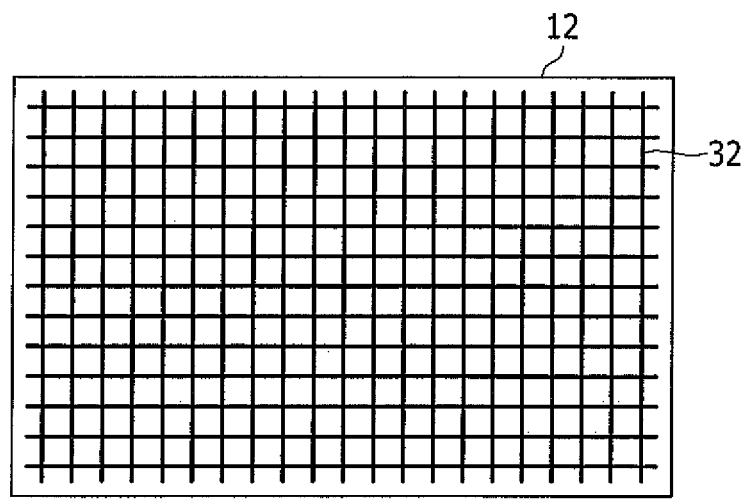

FIG. 2 is a schematic diagram showing an apparatus for temporarily bonding and delaminating a substrate on a carrier, according to an exemplary embodiment of the present invention. FIGS. 3 and 4 are plan views showing examples of the arrangement of a wire within an adhesion layer of the apparatus of FIG. 2, according to exemplary embodiments of the present invention.

For convenience of explanation, a description of elements, processes, and configurations previously described may be omitted.

Referring to FIGS. 2 to 4, an apparatus 1' for temporarily bonding and delaminating the substrate 4 on the carrier 2 in accordance with an exemplary embodiment may include an adhesion layer 12 and a metal wire 32 disposed within (e.g., buried in) the adhesion layer 12.

The adhesion layer 12 may be formed of a material having no electrical conductivity, or a low electrical conductivity. Inclusion of the metal wire 32 within the adhesion layer 12 permits the adhesion layer 12 to function similarly to the electrically conductive adhesion layer 10 described with reference to FIG. 1, as described below.

In an exemplary embodiment, the metal wire 32 may be buried in the adhesion layer 12 after the adhesion layer 12 is applied on the carrier 2. In this case, the metal wire 32 may be connected to the current supply source 30 by the conducting wire 34, permitting a high voltage current to be applied thereto.

According to exemplary embodiments, the metal wire 32 buried in the adhesion layer 12 may be disposed in a variety of patterns within the adhesion layer 12. For example, the metal wire 32 may be disposed in a zigzag pattern as shown in FIG. 3, or in a lattice pattern as shown in FIG. 4. Disposing the metal wire 32 in a zigzag pattern or a lattice pattern in the adhesion layer 12 may aid in the uniform dispersal of heat in the adhesion layer 12 (e.g., heat generated when a high voltage current is applied to the adhesion layer 12).

The metal wire 32 may be made of a material having high electrical conductivity such as, for example, aluminum, nickel, copper, or any combination thereof, however the metal wire 32 is not limited thereto.

According to exemplary embodiments, a diameter of the metal wire 32 may range from about 10 μm to about 50 μm, and more specifically, from about 15 μm to about 30 μm. However, the diameter of the metal wire 32 is not limited thereto.

When the metal wire 32 is buried in the adhesion layer 12, a high voltage current may be applied to the metal wire 32, causing the metal wire 32 to be rapidly heated, thereby break the bond created by the adhesion layer 12, as described above.

According to exemplary embodiments, the flexible substrate 4 and the carrier 2 may be separated from each other by configuring the adhesion layer 12 such that the current applied to the metal wire 32 is moved throughout a large portion of the wire 32 formed in the zigzag or lattice pattern, and thus, throughout a large portion of the adhesion layer 12. For example, the current applied to the metal wire 32 may be applied in a non-constant manner (e.g., the current may be rotated or shaken through the wire 32).

Figure 5:
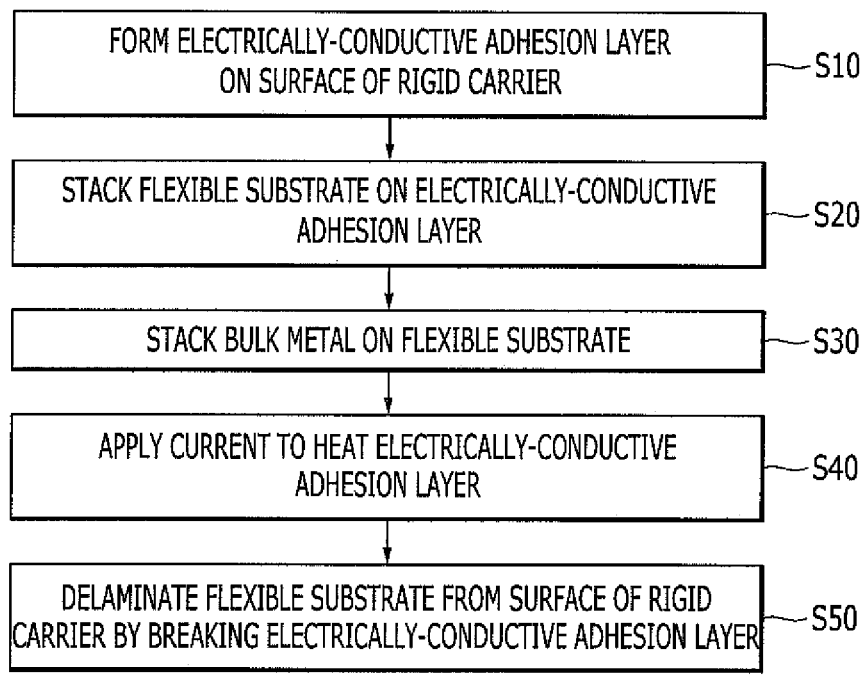
FIG. 5 is a flowchart showing a method of temporarily bonding and delaminating a substrate on a carrier, according to an exemplary embodiment of the present invention.

FIG. 5 is a flowchart showing a method of temporarily bonding and delaminating a substrate on a carrier, according to an exemplary embodiment of the present invention.

Referring to FIGS. 1 to 5, a method for temporarily bonding and delaminating a substrate on a carrier according to an exemplary embodiment includes forming an electrically conductive adhesion layer on a carrier (e.g., a rigid carrier) at operation S10.

The adhesion layer may be formed, for example, by applying an adhesive formed of an electrically conductive material to the carrier 2 (see FIG. 1), or by burying the metal wire 32 within the adhesion layer 12 (see FIG. 2). As described above, the electrically conductive adhesion layer 10 or 12 may be formed such that a high voltage current may be supplied thereto.

The flexible substrate 4 is laminated on the electrically conductive adhesion layer 10 or 12 at operation S20.

The bulk metal 20 may be laminated on the flexible substrate 4 or the carrier 2 at operation S30. In exemplary embodiments, the bulk metal 20 may not be included.

The electrically conductive adhesion layer 10 or 12 is heated by applying a high voltage current to the electrically conductive adhesion layer 10 or 12 at operation S40.

Upon heating the electrically conductive adhesion layer 10 or 12, the bond created by the electrically conductive adhesion layer 10 may be broken, thereby permitting the delamination of the flexible substrate 4 from the surface of the carrier 2 without damaging the flexible substrate 4 at operation S50.

As described above, according to exemplary embodiments of the present invention, a flexible substrate may be coupled to a carrier using an electrically conductive adhesion layer that serves as a means for bonding and coupling the flexible substrate to the carrier in a non-permanent manner, and permits the flexible substrate to be delaminated from the carrier after a manufacturing process has been performed.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. An apparatus for temporarily bonding a substrate of a display device on a carrier, comprising:
   an electrically conductive adhesion layer disposed between the carrier and the substrate; and
   a current supply source configured to apply a current to the electrically conductive adhesion layer,
   wherein the electrically conductive adhesion layer contacts the carrier and the substrate, and is formed of an adhesive that is electrically conductive and that has a temperature resistance.

2. The apparatus of claim 1, wherein the electrically conductive adhesion layer comprises a metal wire disposed within the electrically conductive adhesion layer.

3. The apparatus of claim 2, wherein the metal wire is disposed within the electrically conductive adhesion layer in a zigzag pattern or a lattice pattern.

4. The apparatus of claim 3, wherein the metal wire comprises at least one of aluminum, nickel, and copper.

5. The apparatus of claim 4, wherein a range of a diameter of the metal wire is about 10 μm to about 50 μm.

6. The apparatus of claim 1, wherein the carrier is a rigid carrier.

7. The apparatus of claim 1, wherein the substrate is a flexible substrate.

8. The apparatus of claim 1, wherein the electrically conductive adhesive comprises a polyimide resin.

9. The apparatus of claim 1, further comprising:
   a bulk metal disposed on the substrate and contacting a surface of at least one of the substrate and the carrier.

10. The apparatus of claim 9, wherein the bulk metal is at least one of copper, aluminum, nickel, and titanium.

11. A method of temporarily bonding a substrate of a display device on a carrier, comprising:
    forming an electrically conductive adhesion layer on a surface of the carrier, wherein the electrically conductive adhesion layer contacts the carrier and the substrate, and is formed of an adhesive that is electrically conductive and that has a temperature resistance;
    laminating the substrate on the electrically conductive adhesion layer;
    applying a current to the electrically conductive adhesion layer to heat the electrically conductive adhesion layer; and
    delaminating the substrate from the surface of the carrier by breaking a bond formed by the electrically conductive adhesion layer.

12. The method of claim 11, wherein forming the electrically conductive adhesion layer comprises burying a metal wire within the electrically conductive adhesion layer.

13. The method of claim 11, further comprising:
    disposing a bulk metal on the substrate, wherein the bulk metal contacts a surface of at least one of the substrate and the carrier.

* * * * *